United States Patent
Kikkawa et al.

(10) Patent No.: US 8,536,294 B2
(45) Date of Patent: Sep. 17, 2013

(54) ADHESIVE COMPOSITION

(75) Inventors: Atsushi Kikkawa, Kanagawa (JP);
Kazushi Kimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 857 days.

(21) Appl. No.: 11/574,632

(22) PCT Filed: Aug. 26, 2005

(86) PCT No.: PCT/JP2005/015537
§ 371 (c)(1),
(2), (4) Date: Mar. 2, 2007

(87) PCT Pub. No.: WO2006/025278
PCT Pub. Date: Mar. 9, 2006

(65) Prior Publication Data
US 2008/0319142 A1     Dec. 25, 2008

(30) Foreign Application Priority Data

Sep. 2, 2004 (JP) .................................. 2004-255545

(51) Int. Cl.
*C08G 77/26* (2006.01)
(52) U.S. Cl.
USPC .......................................................... 528/27
(58) Field of Classification Search
USPC .......................................................... 528/27
See application file for complete search history.

(56) References Cited

U.S. PATENT DOCUMENTS

| | | | | |
|---|---|---|---|---|
| 3,391,054 | A | * | 7/1968 | Lewis et al. ................. 428/425.5 |
| 3,649,599 | A | * | 3/1972 | Swanson et al. .................. 528/28 |
| 4,791,214 | A | | 12/1988 | Mori et al. |
| 4,981,987 | A | | 1/1991 | Sugimori et al. |
| 5,041,481 | A | * | 8/1991 | Sugimori et al. ............. 524/188 |
| 5,134,234 | A | * | 7/1992 | Parrinello et al. ............. 544/221 |
| 5,942,073 | A | | 8/1999 | Mowrer et al. |
| 6,362,300 | B1 | * | 3/2002 | Araki et al. ...................... 528/28 |
| 7,162,110 | B2 | | 1/2007 | Kohinata et al. |

FOREIGN PATENT DOCUMENTS

| | | |
|---|---|---|
| EP | 1 312 659 A1 | 5/2003 |
| JP | 52-45634 | 4/1977 |
| JP | 61-203185 A | 9/1986 |
| JP | 61-287977 A | 12/1986 |
| JP | 62-20539 A | 1/1987 |
| JP | 62-20580 A | 1/1987 |
| JP | 4-275383 A | 9/1992 |
| JP | 6-80946 A | 3/1994 |
| JP | 9-241352 A | 9/1997 |
| JP | 11-209682 A | 8/1999 |
| JP | 2001-510492 | 7/2001 |
| JP | 2002-173661 A | 6/2002 |
| JP | 2004-99863 A | 4/2004 |
| JP | 2005-281073 A | 10/2005 |
| JP | 2005-281501 A | 10/2005 |
| JP | 2005-281528 A | 10/2005 |
| TW | 584659 B | 4/2004 |
| WO | WO-02/083806 A1 | 10/2002 |
| WO | WO-2005/007751 A1 | 1/2005 |

OTHER PUBLICATIONS

Preliminary Report on Patentability issued in related International Application No. PCT/JP2005/015537 on Mar. 20, 2007.
Supplementary European Search Report in European application 05780864.4 dated Oct. 14, 2009.

* cited by examiner

*Primary Examiner* — Kuo-Liang Peng
(74) *Attorney, Agent, or Firm* — Novak Druce Connolly Bove + Quigg LLP (57) ABSTRACT

It is an object of the present invention to provide an adhesive composition which is moisture-curable, has excellent adhesive properties and resistance to moist heat, and exhibits excellent durability even when used for joining materials having different coefficients of linear expansion. The present invention provides an adhesive composition having: a reactive silicon-containing group-bearing compound (A) which includes a compound (c) formed by reacting a silane coupling agent (a) having a reactive silicon-containing group and a functional group with a compound (b) having at least one reactive group to react with the functional group and at least one aromatic ring, wherein the reactive silicon-containing group-bearing compound (A) has a number-average molecular weight per reactive silicon-containing group of 800 or less.

3 Claims, 1 Drawing Sheet

ADHESIVE COMPOSITION

CROSS-REFERENCE TO RELATED APPLICATIONS

This application is a National Stage of PCT/JP2005/015537 filed Aug. 26, 2005 which in turn claims priority from Japanese Application 2004-255545, filed Sep. 2, 2004 disclosures of which are incorporated herein by reference.

TECHNICAL FIELD

The present invention relates to an adhesive composition. More particularly, the invention relates to an adhesive composition which is suitable for bonding optical fibers to ferrules.

BACKGROUND ART

The growing popularity of the Internet in recent years has made technology that increases the communications bandwidth more important, leading to a rise in the use of optical fiber networks. The coupling technology most commonly used today for the assembly of optical materials and optical components employed in such optical communications systems involves the use of connectors to connect one optical fiber to another. Adhesive compositions for securing the optical fibers to the ferrule within such a connector are required to have a high adhesive strength and reliability. In particular, when the optical fibers are bonded to a connector with an adhesive, because the optical fibers are always in a mutually pressure-bonded state under the action of a spring, the adhesive between the optical fibers and the ferrule constantly incurs shear stress. Moreover, the optical fibers are sometimes pulled in the lengthwise direction of the ferrules and subjected to large loads. The adhesive is thus required to have a high shear strength.

Moreover, because optical fibers are sometimes installed outdoors or in an attic, for example, the adhesive is also required to be capable of maintaining a sufficient bond strength even in a harsh environment, such as at high temperature and high humidity.

Quartz and glass have hitherto been used as optical fiber materials. However, plastic optical fibers (POF) have been developed which are low-cost, easy to work, and have a good flex strength, preventing the fibers from breaking easily. Such plastic optical fibers are being used in short-range communications applications, such as home networks and digital consumer electronics. Hence, adhesive compositions for optical fibers are required to be capable of bonding not only to glass, but also to plastic (primarily acrylic plastic).

Up until now, epoxy-based adhesives and the like have been used as adhesive compositions for optical fibers. However, recent research has shown there to be problems with the durability of epoxy adhesives. Also, the fact that epoxy adhesives must be heated to about 110° C. to cure complicates the work done at the site where connection is actually carried out. In addition, the use of epoxy adhesives may cause health problems such as rashes.

Patent Document 1 discloses an adhesive composition composed primarily of polysiloxane which is intended to provide excellent heat resistance, reduce bubble formation during curing, and eliminate defects such as clouding due to bubbles and the like.

Patent Document 1: JP 2002-173661 A

DISCLOSURE OF THE INVENTION

Problems to be Solved by the Invention

However, because the adhesive composition described in Patent Document 1 is composed primarily of polysiloxane, when held for a long time in a high-humidity environment, moisture may infiltrate, lowering the bond strength.

Optical fibers are typically made of glass or plastic and ferrules are typically made of generally zirconia or crystallized glass. The optical fiber material thus generally has a much higher coefficient of linear expansion than the ferrule material. As a result, under thermal cycling (repeated exposure to high temperatures and low temperatures), shear stresses will arise in the adhesive used to bond together the optical fiber and the ferrule, sometimes resulting in separation at the bonding interface, which may lower the durability.

It is therefore an object of the present invention to provide an adhesive composition which is moisture-curable, has excellent adhesive properties and resistance to moist heat, and exhibits excellent durability even when used for joining materials having different coefficients of linear expansion.

Means to Solve the Problems

As a result of extensive investigations, the inventors of the present invention have discovered that adhesive compositions which comprise a reactive silicon-containing group-bearing compound that includes a specific compound having a reactive silicon-containing group and an aromatic ring, and in which the reactive silicon-containing group-bearing compound has a molecular weight per reactive silicon-containing group within a specific range, are moisture curable, have excellent adhesive properties and resistance to moisture heat, and can exhibit excellent durability even when used for joining materials having different coefficients of linear expansion. The inventors ultimately arrived at the present invention on the basis of these findings.

That is, the invention provides (1) to (7) below.

(1) An adhesive composition comprising: a reactive silicon-containing group-bearing compound (A) which includes a compound (c) formed by reacting a silane coupling agent (a) having a reactive silicon-containing group and a functional group with a compound (b) having at least one reactive group to react with the functional group and at least one aromatic ring, wherein the reactive silicon-containing group-bearing compound (A) has a number-average molecular weight per reactive silicon-containing group of 800 or less.

(2) The adhesive composition of (1) above, wherein the reactive silicon-containing group on the reactive silicon-containing group-bearing compound (A) is a hydrolyzable silicon-containing group.

(3) The adhesive composition of (1) or (2) above, wherein the functional group on the silane coupling agent (a) or the reactive group on the compound (b) is an epoxy group.

(4) The adhesive composition of any one of (1) to (3) above, wherein the functional group on the silane coupling agent (a) or the reactive group on the compound (b) is an amino group or an imino group.

(5) The adhesive composition of (1) or (2) above, wherein the silane coupling agent (a) is an epoxysilane compound and the compound (b) is an aromatic amine compound.
(6) The adhesive composition of (1) or (2) above, wherein the silane coupling agent (a) is an iminosilane compound and the compound (b) is an aromatic epoxy compound.
(7) The adhesive composition of any one of (1) to (6) above, which further comprises a curing catalyst.

Effects of the Invention

The adhesive composition of the invention is moisture-curable, has excellent adhesive properties and resistance to moist heat, and exhibits excellent durability even when used to join materials having different coefficients of linear expansion.

| Legend | |
|---|---|
| 1: | optical fiber |
| 2: | optical fiber core |
| 3: | optical fiber cladding |
| 4: | polymer coating |
| 6: | adhesive layer |
| 7: | ferrule |
| 8: | plug |
| 11: | adhesive |
| 13: | optical fiber |
| 15: | ferrule |

BEST MODE FOR CARRYING OUT THE INVENTION

The present invention is described below in detail.
The adhesive composition of the present invention (also referred to below as the "inventive composition") comprises a reactive silicon-containing group-bearing compound (A) which includes a compound (c) formed by reacting a silane coupling agent (a) having a reactive silicon-containing group and a functional group with a compound (b) having at least one reactive group to react with the functional group and at least one aromatic ring. The reactive silicon-containing group-bearing compound (A) has a number-average molecular weight per reactive silicon-containing group of 800 or less.

The silane coupling agent (a) is not subject to any particular limitation, provided it is a compound having at least one reactive silicon-containing group and at least one functional group.

The reactive silicon-containing group is a silicon-containing group which has from one to three reactive groups attached to the silicon atom and which is capable of crosslinking by causing a reaction to occur in the presence of moisture or a crosslinking agent, and with the use of a catalyst or the like if necessary. Examples include halogenated silicon-containing groups, hydrogenated silicon-containing groups and hydrolyzable silicon-containing groups. The silane coupling agent (a) may have one or more such reactive silicon-containing groups.

Of the foregoing reactive silicon-containing groups, hydrolyzable silicon-containing groups are preferred because they enable moisture-curable compositions of excellent shelf stability to be obtained.

Halogenated silicon-containing groups have from one to three halogen groups attached to the silicon atom. Examples include the chlorodimethylsilyl group, the dichloromethylsilyl group and the trichlorosilyl group.

Hydrogenated silicon-containing groups have from one to three hydrogen atoms attached to the silicon atom. Examples include the hydrodimethylsilyl group, the dihydromethylsilyl group and the trihydrosilyl group.

Halogenated silicon-containing groups are capable of crosslinking by triggering, together with the above hydrogenated silicon-containing group, for example, a dehydrohalogenation reaction so as to form a bond. Halogenated silicon-containing groups are also capable of crosslinking by causing a metathesis reaction with a Grignard reagent, then triggering a reaction involving the removal of halogenated metal so as to form a silicon-carbon bond. The halogenated silicon-containing groups are additionally capable of crosslinking by, with the use of an alkali metal or magnesium, triggering a reductive silylation reaction with an aromatic hydrocarbon, a conjugated diene, an aromatic aldehyde, a ketone, a carboxylic acid, an ester or an imine so as to form a silicon-carbon bond.

Hydrogenated silicon-containing groups are capable of crosslinking by, for example, inducing a dehydrohalogenation reaction with the above halogenated silicon-containing groups so as to form a bond. Alternatively, hydrogenated silicon-containing groups are capable of crosslinking by triggering a hydrosilylation reaction with a compound having an unsaturated carbon bond so as to form a silicon-carbon bond.

Hydrolyzable silicon-containing groups are silicon-containing groups which have from one to three hydroxyl groups and/or hydrolyzable groups attached to the silicon atom and which are capable of crosslinking by inducing a condensation reaction in the presence of moisture or a crosslinking agent, with the use of a catalyst or the like if necessary, to form a siloxane bond. Illustrative examples include alkoxysilyl groups, alkenyloxysilyl groups, acyloxysilyl groups, aminosilyl groups, aminoxysilyl groups, oxime silyl groups and amidosilyl groups. Suitable use can be made of alkoxysilyl groups, alkenyloxysilyl groups, acyloxysilyl groups, aminosilyl groups, aminoxysilyl groups, oxime silyl groups, amidosilyl groups and the like of the following formulas.

[Chemical Formula 1]

Of these, alkoxysilyl groups are preferred because they are easy to handle.

The alkoxy group attached to the silicon atom on the alkoxysilyl group, while not subject to any particular limitation, is preferably methoxy, ethoxy or propoxy because of the ready availability of the starting materials.

Groups other than the alkoxy group that are attached to the silicon atom on the alkoxysilyl group are not subject to any particular limitation. Suitable examples include hydrogen and alkyl, alkenyl or arylalkyl groups having up to 20 carbon atoms, such as methyl, ethyl, propyl and isopropyl.

The silane coupling agent (a) has a functional group, examples of which include epoxy, amino, imino, isocyanato, vinyl, styryl, methacryloxy, acryloxy, ureido, chloropropyl, mercapto and sulfide groups.

Illustrative examples of the silane coupling agent (a) include epoxy silane compounds such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and γ-glycidoxypropylmethyldiethoxysilane; ureidosilane compounds such as γ-ureidopropyltrimethoxysilane; aminosilane compounds such as γ-aminopropyltrimethoxysilane, γ-aminopropyltriethoxysilane, γ-aminopropylmethyldimethoxysilane, γ-aminopropylethyldiethoxysilane, bistrimethoxysilylpropylamine, bistriethoxysilylpropylamine, bismethoxydimethoxysilylpropylamine, bisethoxydiethoxysilylpropylamine, N-β-(aminoethyl)-γ-aminopropyltrimethoxysilane, N-β-(aminoethyl)-γ-aminopropylmethyldimethoxysilane, N-β-(aminoethyl)-γ-aminopropyltriethoxysilane, N-β-(aminoethyl)-γ-aminopropylethyldiethoxysilane, 3,3-dimethyl-4-aminobutyltrimethoxysilane and 3,3-dimethyl-4-aminobutylmethyldimethoxysilane; and iminosilane compounds such as (N-cyclohexylaminomethyl)methyldiethoxysilane, (N-cyclohexylaminomethyl)triethoxysilane, (N-phenylaminomethyl)methyldimethoxysilane, (N-phenylaminomethyl)trimethyloxysilane, the compound of formula (1) below, and N-phenyl-3-aminopropyltrimethoxysilane of formula (2) below.

[Chemical Formula 2]

(1)

(2)

Additional examples include mercaptosilane compounds such as γ-mercaptopropyltrimethoxysilane, γ-mercaptopropyltriethoxysilane, γ-mercaptopropylmethyldimethoxysilane and γ-mercaptopropylmethyldiethoxysilane; (poly)sulfide silane compounds such as bis(triethoxysilylpropyl)tetrasulfide and bis(triethoxysilylpropyl)disulfide; vinylsilane compounds such as vinyltrichlorosilane, vinyltrimethoxysilane, vinyltriethoxysilane and vinyltris(β-methoxyethoxy)silane; and methacryloxysilane compounds such as γ-methacryloxypropylmethyldimethoxysilane, γ-methacryloxypropyltrimethoxysilane, γ-methacryloxypropylmethyldiethoxysilane and γ-methacryloxypropyltriethoxysilane.

Still further examples include carboxysilane compounds such as β-carboxyethyltriethoxysilane, β-carboxyethylphenylbis(2-methoxyethoxy)silane and N-β-(carboxymethyl)aminoethyl-γ-aminopropyltrimethoxysilane; isocyanatosilane compounds such as γ-isocyanatopropyltrimethoxysilane, γ-isocyanatopropyltriethoxysilane, γ-isocyantopropylmethyldiethoxysilane, γ-isocyanatopropylmethyldimethoxysilane, γ-isocyanatoethyltrimethoxysilane, γ-isocyanatoethyltriethoxysilane, γ-isocyanatoethylmethyldiethoxysilane and γ-isocyanatoethylmethyldimethoxysilane; and halosilane compounds such as γ-chloropropyltrimethoxysilane.

These may be used singly or as a combination of two or more thereof.

The silane coupling agent (a) used in the inventive composition may be either a commercially available product or may be synthesized. No particular limitation is imposed on the synthesis conditions. Synthesis may be carried out by a known method and under known conditions.

The compound (b) is not subject to any particular limitation, provided it has at least one reactive group to react with the functional group on the silane coupling agent (a) and at least one aromatic ring.

The reactive group is suitably selected according to the type of functional group on the silane coupling agent (a). Examples include epoxy, amino, imino, isocyanato, vinyl, styryl, methacryloxy, acryloxy, ureido, chloropropyl, mercapto and sulfide groups.

The compound (b) is exemplified by aromatic amine compounds, aromatic epoxy compounds, aromatic urethane compounds and the like.

The aromatic amine compounds are compounds having at least one amino group and/or imino group and at least one aromatic ring. Examples include methylenedianiline (MDA), diaminodiphenylsulfone, diaminodiphenyl ether, diaminodiphenyl ketone, phenylenediamine, xylylenediamine and 2,2-bis(4-aminophenyl)propane.

The aromatic epoxy compounds are compounds having at least one epoxy group and at least one aromatic ring. Examples include glycidyl ether-type epoxy compounds obtainable by reacting a polyphenol such as bisphenol A or bisphenol F with epichlorohydrin; glycidylamino glycidyl ester-type epoxy compounds derived from aminophenol, aminoalkylphenols or the like; glycidylamino glycidyl ester-type epoxy compounds derived from aminobenzoic acid; and glycidylamine-type epoxy compounds derived from aniline, toluidine, tribromoaniline, xylylenediamine, 4,4'-diaminodiphenylmethane, 4,4'-diaminodiphenylsulfone or the like.

The aromatic urethane compounds are compounds having at least one urethane bond and at least one aromatic ring. Examples include urethane prepolymers obtainable by mixing and reacting a polyol compound such as polyether polyol with an aromatic polyisocyanate compound such as diphenylmethane diisocyanate (MDI) in a ratio that provides an excess of the isocyanato groups on the polyisocyanate compound with respect to the hydroxyl groups on the polyol compound.

The compound (c) is obtainable by reacting the above silane coupling agent (a) with the above compound (b). The compound (c) has at least one reactive silicon-containing group and at least one aromatic ring. Because the compound (c) has an aromatic ring, the cured composition has an excellent mechanical strength and excellent resistance to moist heat. In this specification, "moist heat resistance" refers to the property of being able to maintain good adhesive properties even when held for a long time in a high-humidity or high-temperature, high-humidity environment.

Here, it is preferable for either the functional group on the silane coupling agent (a) or the reactive group on the compound (b) to be an epoxy group. If either the functional group on the silane coupling agent (a) or the reactive group on the is thought to be the reason why the durability increases when the inventive composition is used.

It is advantageous for the functional group on the silane coupling agent (a) or the reactive group on compound (b) to be an amino group or an imino group because the reactivity of the reactive silicon-containing group can thereby be increased.

A first preferred embodiment of the compound (c) is a compound obtainable by reacting the above epoxysilane compound with the above aromatic amine compound. Examples include compounds obtainable by reacting an aromatic amine compound having two amino groups per molecule with four equivalents of an epoxysilane compound having one epoxy group per molecule. A more specific example is a compound of formula (3) below obtainable by reacting methylenedianiline (MDA) with four equivalents of 3-glycidoxypropyltrimethoxysilane.

[Chemical Formula 3]

compound (b) is an epoxy group, the resulting compound (c) will have a hydroxyl group derived from an epoxy group. As a consequence, in the resulting composition of the present invention, intermolecular hydrogen bonds form between this hydroxyl group and other hydroxyl groups and/or silanol groups which have not taken part in crosslinking, thereby improving the mechanical strength, e.g., shear strength, and conferring excellent adhesive properties and an excellent resistance to moist heat. Moreover, the cure shrinkage increases to a suitable degree, giving the adhesive composition an excellent durability even when used to join materials having different coefficients of linear expansion.

The reason why, if the cure shrinkage increases to a suitable degree, the durability will improve even when the adhesive composition is used to join materials having different coefficients of linear expansion is explained here for an illustrative case in which an optical fiber is bonded to a ferrule using an adhesive.

Figure 1:
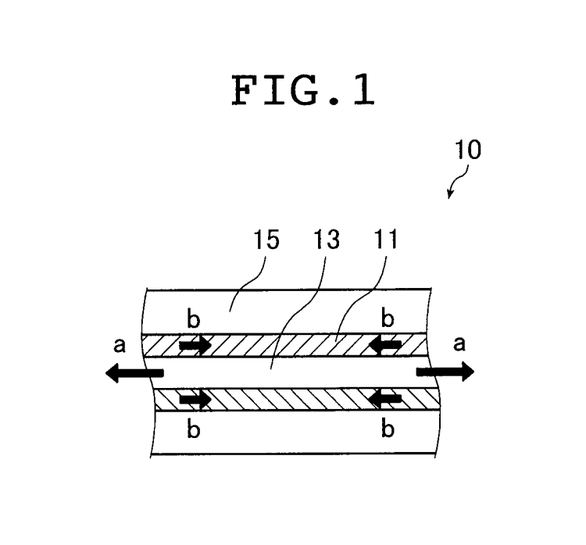
FIG. 1 is a schematic longitudinal sectional view of a part of a connector.

FIG. 1 is a schematic longitudinal sectional view of a portion of a connector.

As shown in FIG. 1, an optical fiber 13 and a ferrule 15 are bonded together with an adhesive 11 in a connector 10. As explained above, when held at a high temperature, due to the large difference between the coefficients of linear expansion for the optical fiber 13 material and the ferrule 15 material, the optical fiber 13 will undergo elongation in the axial direction (arrow a) of the optical fiber relative to the ferrule 15, creating shear stress in the adhesive 11 where the optical fiber 13 and ferrule 15 are bonded together. However, if the adhesive composition used in this bonding area has a high cure shrinkage, the adhesive 11 will shrink (arrow b) to a suitable degree when heated, canceling out the shear stress that arises at the area of the bond between the optical fiber and the ferrule. This A second preferred embodiment of the compound (c) is a compound obtainable by reacting the above iminosilane compound with the above aromatic epoxy compound. An example is a compound obtainable by reacting an aromatic epoxy compound having two epoxy groups per molecule with one equivalent of an iminosilane compound having one imino group per molecule, such as a compound of formula (4) below obtainable by reacting bisphenol A glycidyl ether with one equivalent of the iminosilane compound having the structure shown in the formula (1) above.

[Chemical Formula 4]

Another example of the second preferred embodiment of the compound (c) is a compound obtainable by reacting an aromatic epoxy compound having two epoxy groups per molecule with two equivalents of an iminosilane compound having at least one imino group per molecule. An example is a compound of formula (5) below obtainable by reacting bisphenol A glycidyl ether with two equivalents of the compound having the structure shown in formula (1) above.

[Chemical Formula 5]

(5)

Preferred embodiments of the compound (c) other than the foregoing embodiments of the compound (c) include compounds obtainable by reacting the above iminosilane compound with the above aromatic urethane compound, and compounds obtainable by reacting the above isocyanatosilane compound with the above aromatic amine compound.

The reactive silicon-containing group-bearing compound (A) used in the composition of the present invention includes at least the above compound (c) and may include also a reactive silicon-containing group-bearing compound other than the compound (c).

For moisture curability and good shelf stability, it is preferable for the reactive silicon-containing group on the above-described reactive silicon-containing group-bearing compound (A) to be a hydrolyzable silicon-containing group.

Epoxy-type adhesive compositions that have hitherto been used to bond optical fibers with ferrules have a cure shrinkage of about 3 to 4%.

Each reactive silicon-containing group-bearing compound included in the reactive silicon-containing group-bearing compound (A) used in the inventive composition has a number-average molecular weight per reactive silicon-containing group of 800 or less. As a result, the composition has a high crosslink density and a cure shrinkage of about 6 to 30%. The inventive composition thus has an excellent durability even when used to bond together materials having different coefficients of linear expansion, and also has excellent adhesive properties and an excellent resistance to moist heat. The preferred range in the cure shrinkage is selected as appropriate for the difference between the coefficients of linear expansion of the respective adherends. That is, the number-average molecular weight of the reactive silicon-containing group-bearing compound (A) per reactive silicon-containing group may be suitably adjusted so that the cure shrinkage falls within a range suitable for the difference between the coefficients of linear expansion of the adherends.

Generally, for these properties to be even better, it is desirable that the reactive silicon-containing group-bearing compound (A) have a number-average molecular weight per reactive silicon-containing group of preferably 600 or less, and more preferably 500 or less.

To keep the crosslink density from being too high, it is desirable for the reactive silicon-containing group-bearing compound (A) to have a number-average molecular weight per reactive silicon-containing group of preferably at least 50, and more preferably at least 70.

Reactive silicon-containing group-bearing compounds other than the compound (c) that may be included in the reactive silicon-containing group-bearing compound (A) are exemplified by alkylsilyl esters, alkoxysilane condensates, silane coupling agents and the like.

The alkylsilyl esters are compounds of the following formula, or oligomers thereof.

[Chemical Formula 5]

In the formula, $R^1$ is an alkyl group of 1 to 6 carbons which is preferably methyl, ethyl, n-propyl or isopropyl, and more preferably methyl or ethyl. $R^2$ is an alkyl group of 1 to 3 carbons which is preferably methyl, ethyl, n-propyl or isopropyl, and more preferably methyl or ethyl.

If the alkylsilyl ester is an oligomer of a compound of the above formula, it will have a number-average molecular weight of preferably 90 to 3,000. At a molecular weight within this range, the viscosity is low, providing an excellent ease of use, and the reactivity is high. For these properties to be even better, it is more preferable that the oligomer have a number-average molecular weight of 90 to 2,000.

The alkoxysilane condensate is not subject to any particular limitation. For example, tetraalkoxysilane condensates, as well as epoxy modified products and amino-modified products thereof, may be suitably used. It is preferable for the alkoxysilane condensate to have a number-average molecular weight of about 200 to 3,000.

The silane coupling agent is not subject to any particular limitation. For example, the compounds mentioned above in the description of the silane coupling agent (a) may be used. Preferred silane coupling agents include epoxysilane compounds and isocyanatosilane compounds.

If the reactive silicon-containing group-bearing compound (A) includes also a reactive silicon-containing group-bearing compound other than the above compound (c), it is preferable for the compound (c) to be included in a ratio, based on the overall reactive silicon-containing group-bearing compound (A), of from 5 to 99 wt %. At a content within this range, the adhesive properties and resistance to moist heat are excellent, and an excellent durability can be achieved even when the composition is used to bond between materials having different coefficients of linear expansion. For these properties to be even better, it is desirable that the content of the compound be preferably from 10 to 90 wt %, and more preferably from 20 to 80 wt %.

The composition of the present invention preferably includes also a curing catalyst.

The curing catalyst may be one that is commonly used for reactive silicon-containing group-bearing compounds. Examples include metal carboxylates such as zinc octanoate, iron octanoate, manganese octanoate, tin octanoate, zinc naphthenate, iron naphthenate, tin butanoate, tin caprylate and tin oleate; organotin compounds such as dibutyltin diacetate, dibutyltin dioctoate, dibutyltin dilaurate, dibutyltin dioleate, dioctyltin dilaurate, diphenyltin diacetate, dibutyltin oxide, the products obtained by reacting dibutyltin oxide with phthalic acid esters, dibutyltin dimethoxide, dibutyltin(triethoxysiloxy) and dibutyltin silicate; tin chelate compounds such as dibutyltin diacetylacetonate; titanic acid esters such as tetraethoxytitanium, tetrapropoxytitanium, tetrabutoxytitanium, tetra-2-ethylhexyloxytitanium and tetraisopropenyloxytitanium; titanium chelate compounds such as diisopropoxytitanium bis(acetylacetonate), diisopropoxytitanium bis(ethyl acetoacetate), 1,3-propanedioxytitanium bis(acetylacetonate), 1,3-propanedioxytitanium bis(ethyl acetoacetate) and titanium tris(acetylacetonate); zirconium alkoxides such as tetraisopropoxyzirconium, tetrabutoxyzirconium and tributoxyzirconium stearate; zirconium chelate compounds such as zirconium tetra(acetylacetonate); aluminum alkoxides such as triethoxyaluminum, tripropoxyaluminum and tributoxyaluminum; and aluminum chelate compounds such as diisopropoxyaluminum (ethyl acetoacetate), aluminum tris(acetylacetonate) and aluminum tris(ethyl acetoacetate).

Additional examples of suitable curing catalysts include any of the following amine compounds, as well as carboxylic acid salts thereof: primary amines such as butylamine, hexylamine, octylamine, dodecylamine, oleylamine, cyclohexylamine and benzylamine; secondary amines such as dibutylamine; polyamines such as diethylenetriamine, triethylenetetramine, guanidine, diphenylguanidine and xylylenediamine; cyclic amines such as triethylenediamine, morpholine, N-methylmorpholine, 2-ethyl-4-methylimidazole and 1,8-diazabicyclo[5.4.0]-7-undecene; aminoalcohol compounds such as monoethanolamine, diethanolamine and triethanolamine; and aminophenol compounds such as 2,4,6-tris(dimethylaminomethyl)phenol. Further examples of suitable curing catalysts include quaternary ammonium salts such as benzyltriethylammonium acetate; low-molecular-weight amide resins obtainable from an excess of polyamine and a polybasic acid; and products obtained by reacting an excess of a polyamine with an epoxy compound.

These curing catalysts may be used singly or as a combination of two or more thereof.

Of the above, to discourage vaporization during storage and use, a metal compound is preferred. Organotin compounds, tin chelate compounds and titanic oxide esters are especially preferred because an excellent catalytic performance can be obtained with a very small amount of addition.

The curing catalyst content is preferably from 1 to 50 parts by weight per 100 parts by weight of the reactive silicon-containing group-bearing compound (A). At a curing catalyst content within this range, the curing catalyst can manifest a sufficient action without presenting any difficulty in terms of compatibility with the other ingredients or causing localized heat generation or bubble formation during curing. For these properties to be even better, it is advantageous that the content of the curing catalyst be preferably from 1 to 40 parts by weight, and more preferably from 1 to 30 parts by weight.

If necessary, the inventive composition may also include, within a range that does not compromise the objects of the invention, various additives such as fillers, reaction retarders, antidegradants, antioxidants, pigments (dyes), plasticizers, thixotropic agents, ultraviolet absorbers, flame retardants, solvents, surfactants (including leveling agents), dispersants, dehydrating agents, tackifiers and antistatic agents.

Suitable fillers are exemplified by organic and inorganic fillers in various forms. Examples include fumed silica, calcined silica, precipitated silica, pulverized silica and fused silica; diatomaceous earth; iron oxide, zinc oxide, titanium oxide, barium oxide and magnesium oxide; calcium carbonate, magnesium carbonate and zinc carbonate; pyrophyllite clay, kaolin clay and calcined clay; carbon black; as well as fatty acid-treated, resin acid-treated, urethane compound-treated or fatty acid ester-treated products of any of the above. For cured composition to have good physical properties, it is preferable that the content of the filler be preferably not more than 90 wt % of the overall composition.

The reaction retarder is exemplified by alcohol-type compounds.

The antidegradant is exemplified by hindered phenol-type compounds.

The antioxidant is exemplified by butylhydroxytoluene (BHT) and butylhydroxyanisole (BHA).

Examples of suitable pigments include inorganic pigments such as titanium oxide, zinc oxide, ultramarine, red iron oxide, lithopone, lead, cadmium, iron, cobalt, aluminum, hydrochlorides and sulfates; and organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigments and carbon black.

Examples of suitable plasticizers include dioctyl phthlate (DOP) and dibutyl phthalate (DBP); dioctyl adipate and isodecyl succinate; diethylene glycol dibenzoate and pentaerythritol ester; butyl oleate and methyl acetylrisinoleate; tricresyl phosphate and trioctyl phosphate; and poly(propylene glycol adipate) and poly(butylene glycol adipate). These may be used singly or as mixtures of two or more thereof. For good workability, it is preferable that the plasticizer content be no more than 50 parts by weight per 100 parts by weight of the reactive silicon-containing group-bearing compound (A).

Examples of suitable thixotropic agents include Aerosil (available from Nippon Aerosil Co., Ltd.), and Disparon (available from Kusumoto Kasei KK).

Examples of suitable tackifiers include terpene resins, phenolic resins, terpene-phenolic resins, rosins and xylene resins.

Examples of suitable flame retardants include chloroalkyl phosphates, dimethyl methylphosphonate, bromine-phosphorus compounds, ammonium polyphosphate, neopentyl-bromide-polyethers and brominated polyethers.

Examples of suitable antistatic agents generally include quaternary ammonium salts; and hydrophilic compounds such as polyglycols and ethylene oxide derivatives.

The inventive composition is basically moisture-curable, and can also be cured by heating. When employed in the moisture-curable form, it is very easy to use because there is no need for heating. On the other hand, when used in a heat-curable form, it has a short curing time and an excellent deep cure. The moisture-curable form or the heat-curable form may thus be suitably selected according to the intended application and place of use (work site) for the inventive composition.

The inventive composition may be employed as either a one-part or a two-part adhesive composition for optical fibers. When employed as a one-part adhesive composition, because there is no need to mix the base resin and the curing agent on site, the composition has an excellent ease of use. On the other hand, when employed as a two-part adhesive composition, the curing time is short and the composition has excellent deep cure. Therefore, a one-part or a two-part adhesive composition may be suitably selected according to the intended application and place of use for the inventive composition.

When the inventive composition is to be used as a two-part adhesive composition, it may be prepared as a two-part adhesive composition composed of a base resin containing the above-described reactive silicon-containing group-bearing compound (A), and a curing agent. The curing catalyst and additives that are optionally added may be included on either or both the base resin side and the curing agent side.

Water or some other active hydrogen-bearing compound may be used as the curing agent, although the use of water is preferred from the standpoint of cost and handleability.

The method of preparing the inventive composition is not subject to any particular limitation. For example, the composition may be obtained by thoroughly mixing, and thereby uniformly dispersing, the respective ingredients described above and any optional additives in a mixing apparatus such as a ball mill, preferably at reduced pressure or under an inert atmosphere.

As noted above, the inventive composition is moisture-curable, has excellent adhesive properties and an excellent resistance to moist heat, and has an excellent durability when used to bond together materials having different coefficients of linear expansion.

The inventive composition can easily bond glass materials, plastic materials, metal, organic-inorganic composite materials and the like, and is especially well-suited for bonding between materials having different coefficients of linear expansion and for bonding materials in high-temperature, high-humidity environments. Accordingly, it can be used as an adhesive composition to bond, for example, building materials, optical materials, electronic materials, automotive materials and engineering materials. Because it has excellent properties like those mentioned above, the inventive composition is particularly ideal for bonding optical fibers to ferrules.

EXAMPLES

The invention is illustrated more fully through the following examples. It is to be understood that these examples are not intended to limit the invention.

<Synthesis of Compound (c)>

Synthesis Examples 1 to 4

The ingredients shown in Table 1 below were mixed in the indicated proportions (parts by weight) and stirred under an inert gas atmosphere at 80° C. for 8 hours, thereby giving in the respective examples a compound corresponding to the above compound (c).

The silylation ratio shown in Table 1 for each synthesis example is the stoichiometric ratio of the number of molecules of silane coupling agent (a) reacted to the total number of reactive groups on compound (b), expressed as a percentage. For example, in Synthesis Example 1, one molecule of silane coupling agent (a) is reacted with compound (b) having two epoxy groups, so the silylation ratio is 50%. In Synthesis Example 4, four molecules of silane coupling agent (a) are reacted with compound (b) having two amino groups (which have four active hydrogens), so the silylation ratio is 100%.

The resulting compounds are presumed to be, in Synthesis Example 1, the compound of above formula (4); in Synthesis Example 2, a mixture of the compounds of above formulas (4) and (5); in Synthesis Example 3, the compound of above formula (5); and in Synthesis Example 4, the compound of above formula (3).

TABLE 1

|  | Synthesis Example 1 | Synthesis Example 2 | Synthesis Example 3 | Synthesis Example 4 |
|---|---|---|---|---|
| Silane coupling agent (a) | | | | |
| Epoxysilane compound | | | | 477 |
| Iminosilane compound | 64 | 96 | 128 | |
| Compound (b) | | | | |
| Aromatic epoxy compound | 100 | 100 | 100 | |
| Aromatic amine compound | | | | 100 |
| Silylation ratio | 50% | 75% | 100% | 100% |

The ingredients in Table 1 were as follows.
Epoxysilane compound (3-glycidoxypropyltrimethoxysilane): A-187, produced by Nippon Unicar Co., Ltd.
Iminosilane compound (the compound of formula (1) above): Alink-15, produced by Nippon Unicar Co., Ltd.
Aromatic epoxy compound (bisphenol A glycidyl ether): EPOTOHTO YD-128, produced by Toto Kasei KK.
Aromatic amine compound (methylene dianiline): MDA, produced by Kanto Chemical Co., Ltd.

<Preparation and Evaluation of Two-Part Adhesive Composition>

Examples 1 to 4 and Comparative Examples 1 and 2

The Liquid A ingredients shown in Table 2 below were mixed in the indicated proportions (parts by weight) and thoroughly dispersed using a stirrer, following which the entire amount of the Liquid B ingredient was added and thoroughly dispersed therein, giving the respective compositions shown in Table 2. In Comparative Example 2, a prior-art epoxy-type adhesive composition (produced by Muromachi Technos Co., Ltd. under the trade name Epo-Tek 353ND) was used.

Each of the resulting compositions was evaluated as described below for cure rate (moisture curability), adhesive properties, resistance to moist heat, and cure shrinkage. The results are shown in Table 2.

(Evaluation of Cure Rate (Moisture Curability))

Each of the compositions obtained was held in a 20° C., 65% relative humidity atmosphere, and the tack-free time immediately following preparation of the composition was measured in accordance with the method described in JIS A5758-2004. The composition in Comparative Example 2 was heat-curable, and thus did not cure at room temperature.

(Evaluation of Adhesive Properties and Resistance to Moist Heat)

Test specimens were prepared in each example by arranging two glass plates (30 mm(L)×25 mm(W)×5 mm(T)) so that they overlap at one end by 3 mm over the entire 25 mm width, with a layer of adhesive composition therebetween, then heating and curing the composition at 110° C. for 1 hour. Using the resulting test specimen, the shear strength (initial) was measured in accordance with JIS K6852-1994.

A test specimen prepared in the same way as described above was held for 10 days in a 80° C., 95% RH atmosphere to induce deterioration. This specimen was then used to measure the shear strength (after moist heat deterioration) in the same way as described above.

(Evaluation of Cure Shrinkage)

A dry-type automatic pycnometer (Accupyc 1330-03, manufactured by Shimadzu Corporation) was used to measure the specific gravity (a) of the respective compositions immediately following preparation and the specific gravity (b) of the compositions following 1 hour of heat curing at 110° C. The cure shrinkage was then calculated from the following formula.

Cure Shrinkage(%)=100−[(specific gravity($a$))/(specific gravity($b$))]×100

TABLE 2

|  |  | EX 1 | EX 2 | EX 3 | EX 4 | CE 1 | CE 2 |
|---|---|---|---|---|---|---|---|
| Liquid A | Compound obtained in Synthesis Example 1 |  |  | 50 |  |  |  |
|  | Compound obtained in Synthesis Example 2 | 50 |  |  |  |  |  |
|  | Compound obtained in Synthesis Example 3 |  | 50 |  | 50 |  |  |
|  | Compound obtained in Synthesis Example 4 |  |  |  | 50 |  |  |
|  | Methylsilyl ester | 100 | 100 | 50 | 100 | 100 |  |
|  | Tetraethoxysilane condensate |  |  | 50 |  |  |  |
|  | Epoxysilane compound |  | 20 | 20 | 20 |  |  |
|  | Isocyanatosilane Compound 1 | 10 |  | 10 |  |  |  |
|  | Isocyanatosilane Compound 2 |  | 5 |  |  |  |  |
|  | Curing catalyst | 10 | 10 | 10 | 10 | 10 |  |
|  | Epo-Tek 353ND, liquid A |  |  |  |  |  | 100 |
| Liquid B | Water | 5 | 5 | 5 | 5 | 5 |  |
|  | Epo-Tek 353ND, liquid B |  |  |  |  |  | 10 |
| Evaluations | Tackfree time (mm) | 5 | 3 | 3 | 3 | 5 | not measurable |
|  | Shear strength |  |  |  |  |  |  |
|  | Initial (kgf/cm$^2$) | 88 | 95 | 78 | 92 | 60 | 67 |
|  | After moist heat deterioration (kgf/cm$^2$) | 90 | 92 | 74 | 89 | 15 | 9 |
|  | Cure shrinkage (%) | 16 | 16.5 | 23 | 16 | 19 | 3.5 |

The respective ingredients in Table 2 were as follows. The epoxysilane compound used here was the same as that shown in Table 1.

Methylsilyl ester (the compound of formula (6) below): MSE-100, produced by Wacker Asahikasei Silicone Co., Ltd.

Tetraethoxysilane condensate: MS-56S, produced by Mitsubishi Chemical Corporation.

Isocyanatosilane Compound 1 (1,3,5-tris(trimethyloxysilylpropyl) isocyanurate): Y11597, produced by Nippon Unicar Co., Ltd.

Isocyanatosilane Compound 2 (3-isocyanatopropyltriethoxysilane): A-1310, produced by Nippon Unicar Co., Ltd.

Curing catalyst (dibutyltin diacetylacetonate): U-220, produced by Nitto Kasei Co., Ltd.

[Chemical Formula 7]

(6)

As is apparent from Table 2, the compositions in Examples 1 to 4 which include at least one of the compounds obtained in Synthesis Examples 1 to 4 cured in several minutes at room temperature and exhibited excellent adhesive properties compared with the composition in Comparative Example 1, which did not include the compounds obtained in Synthesis Examples 1 to 4, and the prior-art epoxy adhesive in Comparative Example 2. In particular, the marked difference in shear strength following moist heat deterioration demonstrated that the compositions in Examples 1 to 4 had outstanding resistances to moist heat. Also, compared with the cure shrinkage of the prior-art epoxy-based adhesive composition in Comparative Example 2, the compositions in Examples 1 to 4 had much higher cure shrinkages of 16 to 23%.

<Preparation of One-Part Adhesive Compositions>

Examples 5 to 8 and Comparative Example 3

The ingredients shown in Table 3 below were mixed in the indicated proportions (parts by weight) and thoroughly dispersed using a stirrer, thereby giving the respective compositions shown in Table 3.

Using the resulting compositions obtained in the respective examples, the cure rate (moisture curability) was evaluated in the same way as described above, and the adhesive properties and the resistance to moist heat were evaluated in the way described below. The results are shown in Table 3.

(Evaluation of Adhesive Properties and Resistance to Moist Heat)

Aside from changing the curing conditions to 20° C. and 65% RH for 3 days, test specimens were prepared in the same way as described above, and the shear strength (initial) was measured.

Test specimens were also subjected to deterioration by being held in a 80° C., 95% RH atmosphere for 10 days. The resulting specimens were then used to measure the shear strength (after moist heat deterioration) in the same way as described above.

TABLE 3

| | EX 5 | EX 6 | EX 7 | EX 8 | CE 3 |
|---|---|---|---|---|---|
| Compound obtained in Synthesis Example 1 | | | 50 | | |
| Compound obtained in Synthesis Example 2 | 50 | | | | |
| Compound obtained in Synthesis Example 3 | | 50 | | 50 | |
| Compound obtained in Synthesis Example 4 | | | | 50 | |
| Methylsilyl ester | 100 | 100 | 50 | 100 | 100 |
| Tetraethoxysilane condensate | | | 50 | | |
| Epoxysilane compound | | 20 | 20 | 20 | |
| Isocyanatosilane Compound 1 | 10 | | 10 | | |
| Isocyanatosilane Compound 2 | | 5 | | | |
| Curing catalyst | 10 | 10 | 10 | 10 | 10 |
| Tack-free time (min | 20 | 12 | 158 | 13 | 18 |
| Shear strength | | | | | |
| Initial (kgf/cm²) | 80 | 89 | 68 | 86 | 46 |
| After moist heat deterioration (kgf/cm²) | 88 | 95 | 76 | 91 | 11 |

The respective ingredients in Table 3 were the same as those in Table 2.

As is apparent from Table 3, the one-part adhesive compositions in Examples 5 to 8 which contain the compounds prepared in Synthesis Examples 1 to 4, like the two-part adhesive composition obtained in Examples 1 to 4 shown in Table 2, had excellent adhesive properties and an excellent resistance to moist heat. In particular, the shear strength (initial) when moisture-cured at room temperature was about the same as the shear strength (initial) when heat cured (see Table 2). Hence, the one-part adhesive compositions of Examples 5 to 8 were demonstrated to be fully satisfactory, even when used as moisture-curable adhesive compositions.

<Bonding of Optical Fiber with Ferrule>

Figure 2:
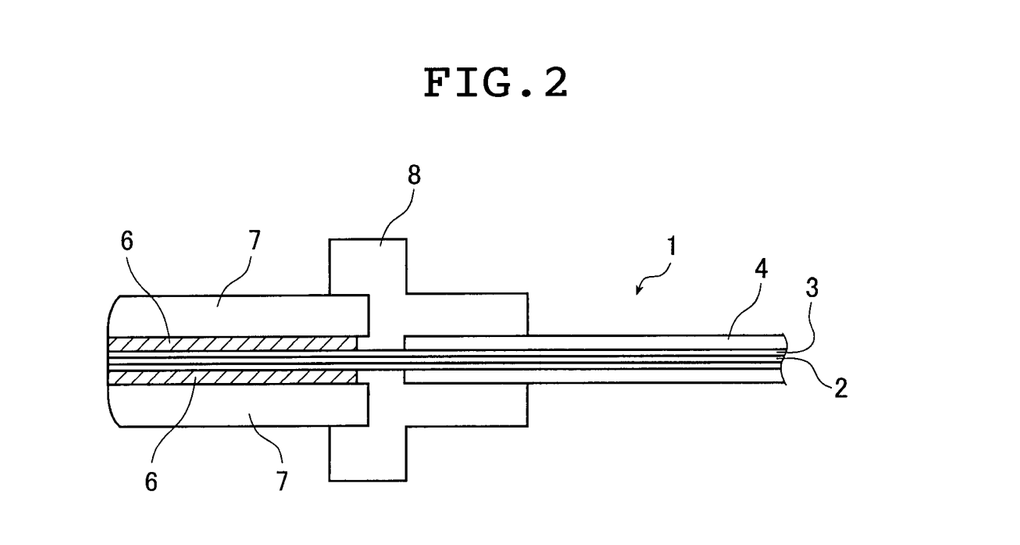
FIG. 2 is a schematic longitudinal sectional view showing an example of the area of connection where an optical fiber and a ferrule have been bonded using the composition of the invention.

FIG. 2 is a schematic longitudinal sectional view showing an example of the connection portion of an optical connector where an optical fiber and a ferrule have been bonded using a composition of the present invention.

As shown in FIG. 2, a 2 cm long portion from which the polymer coating 4 had been removed at one end of a single-mode glass optical fiber (length, about 1 m) having a polymer coating 4, a core 2 and a cladding 3 was coated with the composition of Example 1 or the composition of Comparative Example 2, inserted into the hollow portion of a zirconia ferrule 7 attached to a plug 8, then heated at 110° C. and held stationary for one hour, thereby bonding the optical fiber 1 to the ferrule 7 with the adhesive layer 6. The end face of the ferrule was then precisely polished.

Next, an assembly obtained by bonding this optical fiber 1 and the ferrule 7 (initial specimen) and an identical assembly that was held for 10 days in a 80° C., 95% RH atmosphere (moist heat-deteriorated specimen) were each gripped by the ferrule 7 and the optical fiber 1 and lightly pulled. Of the assemblies obtained by bonding with the composition of Comparative Example 2, which is a prior-art epoxy adhesive, the initial assembly did not experience failure of the bond, but the moist heat deteriorated assembly underwent separation at the interface between the adhesive 6 and the optical fiber 1. By contrast, neither of the assemblies bonded using the composition of Example 1 experienced adhesive failure. This is presumably because the composition of the Example 1 had excellent adhesive properties and an excellent resistance to moist heat and also because, on account of the somewhat high cure shrinkage which is able to cancel out shear stresses that arise due to elongation of the optical fiber in the axial direction, the composition had an improved durability.

The invention claimed is:

1. An adhesive composition comprising:
   a reactive silicon-containing group-bearing compound (c) formed by reacting an iminosilane compound having a reactive silicon-containing group and an imino group with a compound (b) of an aromatic epoxy compound,
   wherein the compound (c) has a tertiary amino group derived from the iminosilane compound,
   wherein the reactive silicon-containing group-bearing compound (c) has a number-average molecular weight per reactive silicon-containing group of 800 or less,
   wherein the iminosilane compound is selected from the group consisting of (N-cyclohexylaminomethyl)methyldiethoxysilane, (N-cyclohexylaminomethyl)triethoxysilane, (N-phenylaminomethyl)methyldimethoxysilane, (N-phenylaminomethyl)trimethyloxysilane, the compound of formula (1) below, and N-phenyl-3-aminopropyltrimethoxysilane of formula (2) below, 2. The adhesive composition of according to claim 1, which further comprises a curing catalyst.

3. The adhesive composition according to claim 1, further comprising at least one member selected from the group consisting of an alkylsilyl ester, an alkoxysilane condensate and a silane coupling agent.

* * * * *